US008849940B1

(12) United States Patent
Gopalakrishnan

(10) Patent No.: US 8,849,940 B1
(45) Date of Patent: Sep. 30, 2014

(54) WIDE AREA NETWORK FILE SYSTEM WITH LOW LATENCY WRITE COMMAND PROCESSING

(75) Inventor: Suresh Gopalakrishnan, East Windsor, NJ (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 742 days.

(21) Appl. No.: 11/956,960

(22) Filed: Dec. 14, 2007

(51) Int. Cl.
*G06F 15/167* (2006.01)
*G06F 15/16* (2006.01)
*G06F 19/00* (2011.01)
*G06F 13/00* (2006.01)
*G06F 13/28* (2006.01)
*G06F 7/38* (2006.01)
*G06F 9/44* (2006.01)
*H04L 1/18* (2006.01)
*H04L 25/03* (2006.01)
*H04N 19/42* (2014.01)

(52) U.S. Cl.
CPC ............. *G06F 15/167* (2013.01); *G06F 15/16* (2013.01); *G06F 19/3425* (2013.01); *G06F 13/00* (2013.01); *G06F 13/28* (2013.01); *G06F 7/38* (2013.01); *G06F 9/44* (2013.01); *H04L 1/1822* (2013.01); *H04L 25/03904* (2013.01); *H04N 19/00478* (2013.01)
USPC ....................................................... 709/213

(58) Field of Classification Search
CPC ............................. G06F 15/167; H04L 1/1822
USPC ....................................................... 709/213
See application file for complete search history.

(56) References Cited

U.S. PATENT DOCUMENTS

| 4,614,841 | A  | * | 9/1986  | Babecki et al. ............. 379/93.29 |
| 4,706,126 | A  | * | 11/1987 | Kondo .................... 358/426.07 |
| 5,196,943 | A  | * | 3/1993  | Hersee et al. ................. 358/403 |
| 5,850,521 | A  | * | 12/1998 | Morganti et al. ............. 709/208 |
| 6,108,707 | A  | * | 8/2000  | Wiese ............................ 709/231 |
| 6,453,354 | B1 | * | 9/2002  | Jiang et al. .................... 709/229 |
| RE38,410  | E  | * | 1/2004  | Hersch et al. ................. 709/203 |
| 6,728,716 | B1 | * | 4/2004  | Bhattacharya et al. ............... 1/1 |
| 7,024,527 | B1 | * | 4/2006  | Ohr .............................. 711/161 |
| 7,082,494 | B1 | * | 7/2006  | Thelin et al. ................... 711/112 |
| 7,165,041 | B1 | * | 1/2007  | Guheen et al. ............... 705/26.1 |
| 7,500,246 | B2 | * | 3/2009  | Saake et al. ................... 719/312 |
| 7,647,526 | B1 | * | 1/2010  | Taylor ......................... 714/6.32 |
| 7,693,962 | B2 | * | 4/2010  | Serlet et al. ................... 709/219 |
| 7,702,851 | B2 | * | 4/2010  | Satoyama et al. ............. 711/114 |
| 7,822,728 | B1 | * | 10/2010 | Chandler et al. ............. 707/704 |
| 8,055,702 | B2 | * | 11/2011 | Lango et al. .................. 709/203 |
| 8,104,044 | B1 | * | 1/2012  | Scofield et al. ............... 719/313 |
| 8,181,180 | B1 | * | 5/2012  | Anderson et al. ............. 718/102 |

(Continued)

OTHER PUBLICATIONS

Spasojevic et al., "An Empirical Study of a Wide-Area Distribution File System", 1996.*

(Continued)

*Primary Examiner* — Ondrej Vostal
(74) *Attorney, Agent, or Firm* — Baker Botts L.L.P.

(57) ABSTRACT

Methods, apparatuses, and systems directed to write command processing in distributed file caching systems. Implementations of the invention allow for write operations to identified files to proceed, while information regarding the identified file is fetched from a remote host and a locally cached version of the file is constructed. Implementations of the present invention can be configured to improve the performance of wide area network file systems, while preserving file consistency.

18 Claims, 7 Drawing Sheets

(56) References Cited

U.S. PATENT DOCUMENTS

| | | | | |
|---|---|---|---|---|
| 8,489,811 | B1* | 7/2013 | Corbett et al. | 711/114 |
| 8,495,204 | B2* | 7/2013 | Shin et al. | 709/224 |
| 2001/0004754 | A1* | 6/2001 | Murayama | 711/114 |
| 2002/0009079 | A1* | 1/2002 | Jungck et al. | 370/389 |
| 2002/0010743 | A1* | 1/2002 | Ryan et al. | 709/205 |
| 2002/0013853 | A1* | 1/2002 | Baber et al. | 709/232 |
| 2002/0078241 | A1* | 6/2002 | Vidal et al. | 709/247 |
| 2002/0107999 | A1* | 8/2002 | Zimmermann et al. | 709/330 |
| 2002/0120763 | A1* | 8/2002 | Miloushev et al. | 709/230 |
| 2002/0169818 | A1* | 11/2002 | Stewart et al. | 709/202 |
| 2003/0009538 | A1* | 1/2003 | Shah et al. | 709/219 |
| 2003/0105734 | A1* | 6/2003 | Hitchen et al. | 707/1 |
| 2003/0158836 | A1* | 8/2003 | Venkatesh et al. | 707/1 |
| 2003/0167317 | A1* | 9/2003 | Deen et al. | 709/219 |
| 2003/0200193 | A1* | 10/2003 | Boucher | 707/1 |
| 2004/0010654 | A1* | 1/2004 | Yasuda et al. | 711/1 |
| 2004/0030731 | A1* | 2/2004 | Iftode et al. | 707/205 |
| 2004/0049636 | A1* | 3/2004 | Campbell et al. | 711/130 |
| 2004/0257931 | A1* | 12/2004 | Kudou et al. | 369/47.1 |
| 2005/0144602 | A1* | 6/2005 | Ngai et al. | 717/151 |
| 2005/0171951 | A1* | 8/2005 | Farmer | 707/9 |
| 2005/0187993 | A1* | 8/2005 | Selman et al. | 707/204 |
| 2005/0289152 | A1* | 12/2005 | Earl et al. | 707/100 |
| 2006/0173985 | A1* | 8/2006 | Moore | 709/223 |
| 2006/0224560 | A1* | 10/2006 | Makita | 707/1 |
| 2006/0248040 | A1* | 11/2006 | Tolvanen et al. | 707/1 |
| 2007/0050778 | A1* | 3/2007 | Lee et al. | 718/107 |
| 2007/0061487 | A1* | 3/2007 | Moore et al. | 709/246 |
| 2007/0168542 | A1* | 7/2007 | Gupta et al. | 709/231 |
| 2007/0174428 | A1* | 7/2007 | Lev Ran et al. | 709/218 |
| 2007/0198685 | A1* | 8/2007 | Phatak | 709/223 |
| 2008/0046920 | A1* | 2/2008 | Bill | 725/34 |
| 2008/0077655 | A1* | 3/2008 | Ganapathy et al. | 709/203 |
| 2008/0091739 | A1* | 4/2008 | Bone et al. | 707/200 |
| 2008/0229023 | A1* | 9/2008 | Plamondon | 711/126 |
| 2009/0006936 | A1* | 1/2009 | Parker et al. | 715/200 |
| 2009/0063859 | A1* | 3/2009 | Maeda | 713/168 |
| 2009/0150518 | A1* | 6/2009 | Lewin et al. | 709/219 |
| 2012/0198161 | A1* | 8/2012 | Chachad et al. | 711/122 |

OTHER PUBLICATIONS

Santry et al., "Deciding when to forget in the Elephant file system", 1999.*

Kistler et al., "Disconnected Operation in the Coda File System", 1992.*

Skala, "Journal of .NET Technologies 2005", 2005.*

Microsoft Corp., "Microsoft Computer Dictionary", 5$^{th}$ edition 2002, p. 200.*

Van Hensbergen et al., "Dynamic Policy Disk Caching for Storage Networking", 2006.*

Merriam-Webster online dictionary, "execute", 2014.*

* cited by examiner

WIDE AREA NETWORK FILE SYSTEM WITH LOW LATENCY WRITE COMMAND PROCESSING

TECHNICAL FIELD

The present disclosure relates to wide area network file systems and file caching over distributed networks.

BACKGROUND

While workers can easily share gigabytes of project data on a local-area network (LAN) using standard file-server technology, such is not the case with workers in remote offices connected over wide-area networks (WANs). With respect to file sharing over WANs, standard file server protocols provide unacceptably slow response times when opening and writing files.

All major file-sharing protocols were designed for LAN environments where clients and servers are located in the same building or campus, including: NFS (Network File System, used for Unix/Linux environments), CIFS (Common Internet File System used for Windows environments), and IPX/SPX (Internetwork Packet Exchange/Sequenced Packet Exchange, used for Novell environments). The assumption that the client and the server would be in close proximity led to a number of design decisions that do not scale across WANs. For example, these file sharing protocols tend to be rather "chatty", insofar as they send many remote procedure calls (RPCs) across the network to perform operations.

For certain operations on a file system using the NFS protocol (such as an rsync of a source code tree), almost 80% of the RPCs sent across the network can be access RPCs, while the actual read and write RPCs typically comprise only 8-10% of the RPCs. Thus 80% of the work done by the protocol is simply spent trying to determine if the NFS client has the proper permissions to access a particular file on the NFS server, rather than actually moving data. In a LAN environment, these RPCs do not degrade performance significantly given the usual abundance of bandwidth, but they do in WANs, because of their high latency. Furthermore, because data movement RPCs make up such a small percentage of the communications, increasing network bandwidth will not help to alleviate the performance problem in WANs.

Therefore, systems have been developed (called wide area file services (WAFS)) which combine distributed file systems with caching technology to allow real-time, read-write access to shared file storage from any location, including locations connected across WANs, while also providing interoperability with standard file sharing protocols such as NFS and CIFS.

WAFS systems typically include edge file gateway (EFG) appliances (or servers), which are placed at multiple remote offices, and one or more file server appliances, at a central office or remote data center relative to the EFG appliance, that allow storage resources to be accessed by the EFG appliances. Each EFG appliance appears as a local fileserver to office users at the respective remote offices. Together, the EFG appliances and file server appliance implement a distributed file system and communicate using a WAN-optimized protocol. This protocol is translated back and forth to NFS and CIFS at either end, to communicate with the user applications and the remote storage.

The WAN-optimized protocol typically may include file-aware differencing technology, data compression, streaming, and other technologies designed to enhance performance and efficiency in moving data across the WAN. File-aware differencing technology detects which parts of a file have changed and only moves those parts across the WAN. Furthermore, if pieces of a file have been rearranged, only offset information will be sent, rather than the data itself.

In WAFS systems, performance during "read" operations is usually governed by the ability of the EFG appliance to cache files and the ability to serve cached data to users while minimizing the overhead of expensive kernel-user communication and context switches, in effect enabling the cache to act just like a high-performance file server. Typically, the cache attempts to mirror the remote data center, so that "read" requests will be satisfied from the local cache with only a few WAN round trips required to check credentials and availability of file updates.

In WAFS systems, "write" operations should maintain data coherency, i.e., file updates ("writes") from any one office should not to conflict with updates from another office. To achieve data coherency, some WAFS systems use file leases. Leases define particular access privileges to a file from a remote office. If a user at an office wants to write to a cached file, the EFG appliance at that office obtains a "write lease", i.e., a right to modify the document before it can do so. The WAFS system ensures that at any time there will be only one EFG appliance that has the write lease on a particular file. Also, when a user at another office tries to open the file, the EFG appliance that has the write lease flushes its data first and optionally can give up the write lease if there are no active writers to the file. In some WAFS systems, a streaming transfer is initiated when a cold or stale file is opened for reads or writes. While the file is being fetched, read requests received at an edge cache are served by passing through the request to the file server. The edge cache, however, blocks write requests until the portion of the file being written has been fetched. Applications that write in a non-sequential manner may face timeout errors due to this blocking.

SUMMARY

In particular embodiments, the present invention provides methods, apparatuses, and systems directed to write command processing in distributed file caching systems. Implementations of the invention allow for write operations to identified files to proceed, while information regarding the identified file is fetched from a remote host and a locally cached version of the file is constructed. Implementations of the present invention can be configured to improve the performance of wide area network file systems, while preserving file consistency.

DESCRIPTION OF THE DRAWINGS

Example embodiments are illustrated in referenced figures of the drawings. It is intended that the embodiments and figures disclosed herein are to be considered illustrative rather than limiting.

FIG. 8 is a flow chart setting forth a method directed to fetching a requested file from a remote host.

DESCRIPTION OF EXAMPLE EMBODIMENT(S)

The following example embodiments are described and illustrated in conjunction with apparatuses, methods, and systems which are meant to be examples and illustrative, not limiting in scope.

As will be apparent from the description below, embodiments of the present invention allow for write command processing with reduced latency and improved performance in a distributed file caching system, such as a wide area network file system.

A. Network Environment

Figure 1A:
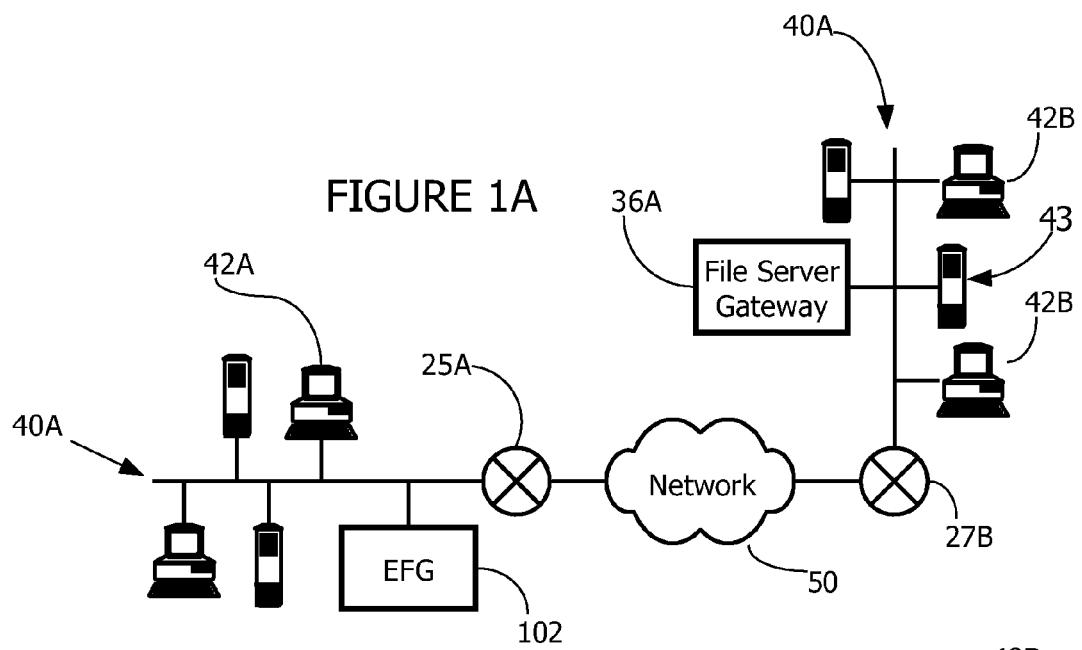
FIGS. 1A-1B are high-level block diagrams illustrating example computer network environments in which embodiments of the present invention might operate.
Figure 1B:
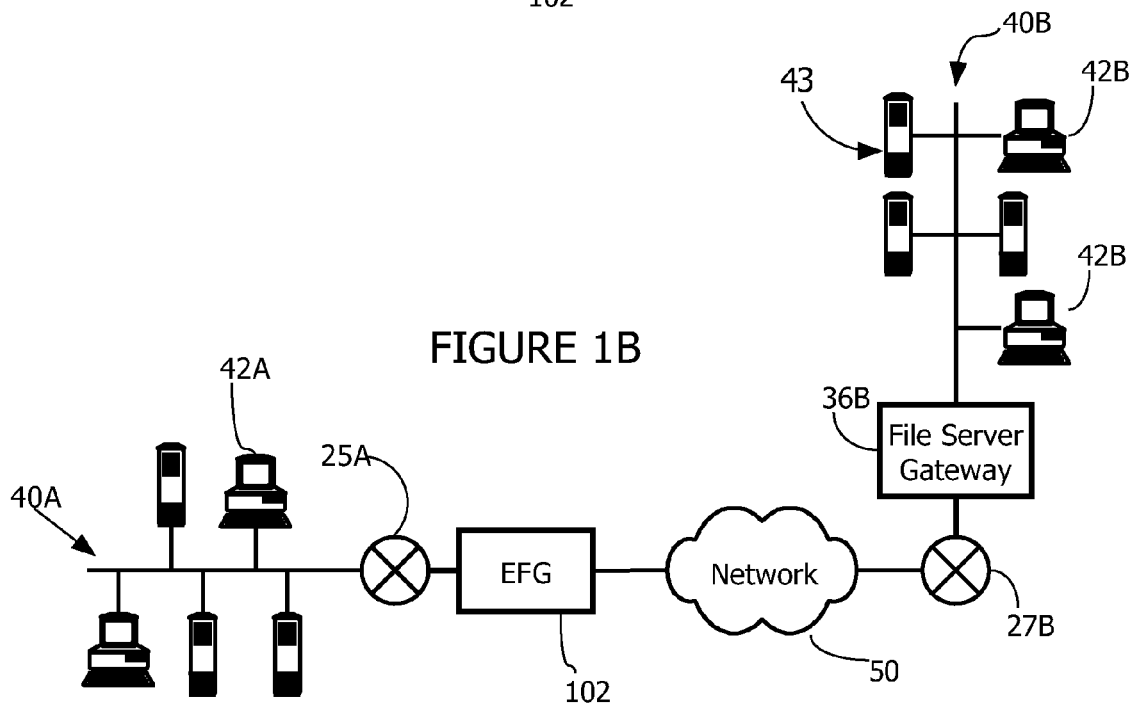

As discussed in the background above, WAFS systems often include one or more EFG appliances 102 (or servers) and one or more remote file server appliances 36 (or servers), typically at a different location, that allow storage resources to be accessed by the EFG appliances 102 on behalf of workstations 42A. FIGS. 1A-1B show at a high level such an arrangement, which might be used with an embodiment of the present invention. In particular, FIGS. 1A-1B show a network 50 connecting a remote file server appliance 36 to EFG appliance 102. In turn, the remote file server appliance 36 is connected, via a LAN (40A, 40B) or other network, to a file server 43 and the EFG appliances 102 are connected, again via a LAN 40A or other network, to workstations 42A. It can be appreciated that EFG appliances 102 may also be remote file server appliances with respect to data stored on resources operably connected to the same LAN or subnet.

In the embodiment of FIG. 1A, a router 25A is interposed between the LAN 40A and the network 50 which is in turn connected to router 27B and LAN 40B. In the embodiment of FIG. 1B, EFG appliance 102 is interposed between router 27B and the network 50. In a similar fashion, router 27B is deployed between the network 50 and the file server appliance 36B.

Figure 2:
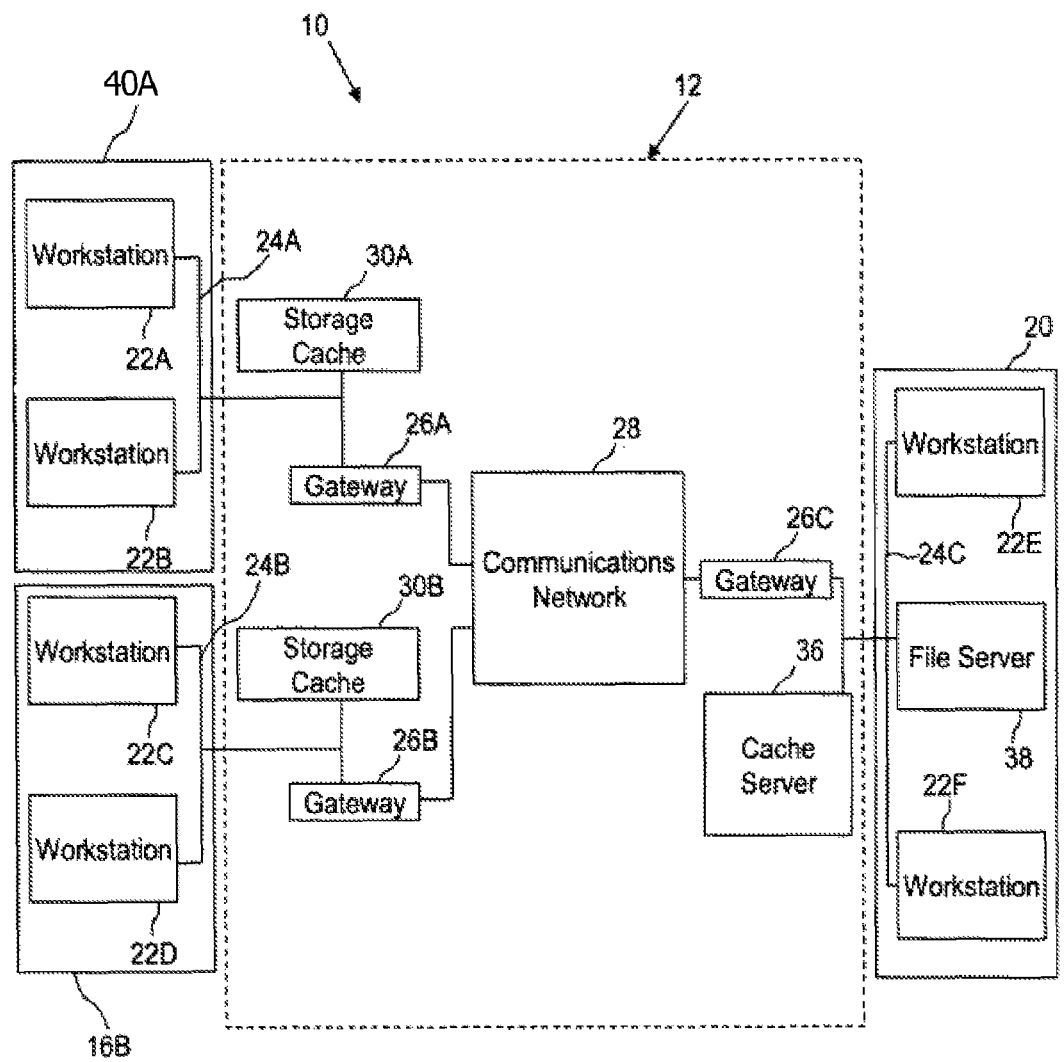
FIG. 2 is a lower-level block diagram illustrating an example computer network environment in which embodiments of the present invention might operate.

FIG. 2 is a block diagram showing, at a lower level, an example computer network environment in which embodiments of the present invention might operate. The network environment 10 includes a storage-caching protocol system 12 that interfaces with a distributed file system application operating at a data center computer system, which is a repository for data files, and a computer system which is associated with a computer workstation that desires to access, i.e., view only (read) or modify (write), data files stored at a file server of a data center system. The data center system is typically at a remote location relative to the computer system. The storage-caching protocol system 12 includes at least one EFG appliance 30A, 30B (here referred to as a "storage cache"), which is coupled to a workstation of an associated remote system, and at least one remote file server appliance 36 (here referred to as a "cache server"), which is coupled to a file server of a data center system, where the storage cache and the cache server utilize a communications link, such as a link established over the Internet, to transfer (i) copies of data files that the associated workstation desires to access, (ii) file update data representative of on any data file modifications entered by authorized workstations that access the data file, and (iii) data associated with the operating features of the storage caching protocol system 12.

Storage caching protocol system 12 in the illustrative network 10 shown in FIG. 2, the system 12 interfaces with work group computer systems 16A and 16B and a central work group data center computer system 20. The system 16A includes computer workstations 22A and 22B interconnected over a communications channel 24A, such as an Ethernet or like medium. Similarly, the system 16B includes computer workstations 22C and 22D interconnected over a communications channel 24B. Each of the workstations 22 is part of or constitutes, for example, a personal computer, a personal digital assistant, or other like electronic device including a processor and memory and having communications capabilities. In addition, the workstations of a system, in combination with the Ethernet, form a LAN and operate in accordance with a conventional distributed file system, such as NFS or CIFS, which provides that a user of a workstation can access data files located remotely from the system in which the workstation is contained.

A communications gateway 26A, 26B, 26C couples the Ethernet 24 of each of the systems 16 to a communications network 28. The network 28, for example, can be a WAN, LAN, the Internet or any like means for providing data communications links between geographically disparate locations. The gateway 26, for example, may implement a VPN Internet connection with remote gateways. The gateway 26 enables data, such as data files accessible in accordance with a distributed file system such as NFS or CIFS, to be transferred between a workstation and a remotely located file server. Furthermore, the functions of gateway 26 may be physically hosted on the same computing device as the storage cache and cache servers.

Referring again to FIG. 2, the storage caching system 12 includes storage caches (EFG appliances) 30A and 30B which are associated with the systems 16A and 16B, respectively. Each storage cache 30 is coupled to the Ethernet 24 and the gateway 26A, 26B of the associated system 16A, 16B. In addition, the storage caching system 12 includes a cache server 36. The cache server 36 is coupled to an associated gateway 26C which is also coupled to the network 28. An Ethernet 24C couples the gateway 26C and the cache server 36 to a file server 38 and workstations 22D and 22E contained in the data center system 20. The file server 38 is a file storage device, such as a NAS (Network Attached Storage), which is a repository for data files and provides for distribution of stored data files to authorized workstations in accordance with the operation of distributed file systems, such as NFS or CIFS, which are implemented at the authorized workstations of the systems 16 and the data center 20. For purposes of illustration, it is assumed that all of the workstations 22 in the systems 16 and in the data center 20 constitute authorized workstations and operate in accordance with a distributed file system compatible with that of the server 38.

Figure 3:
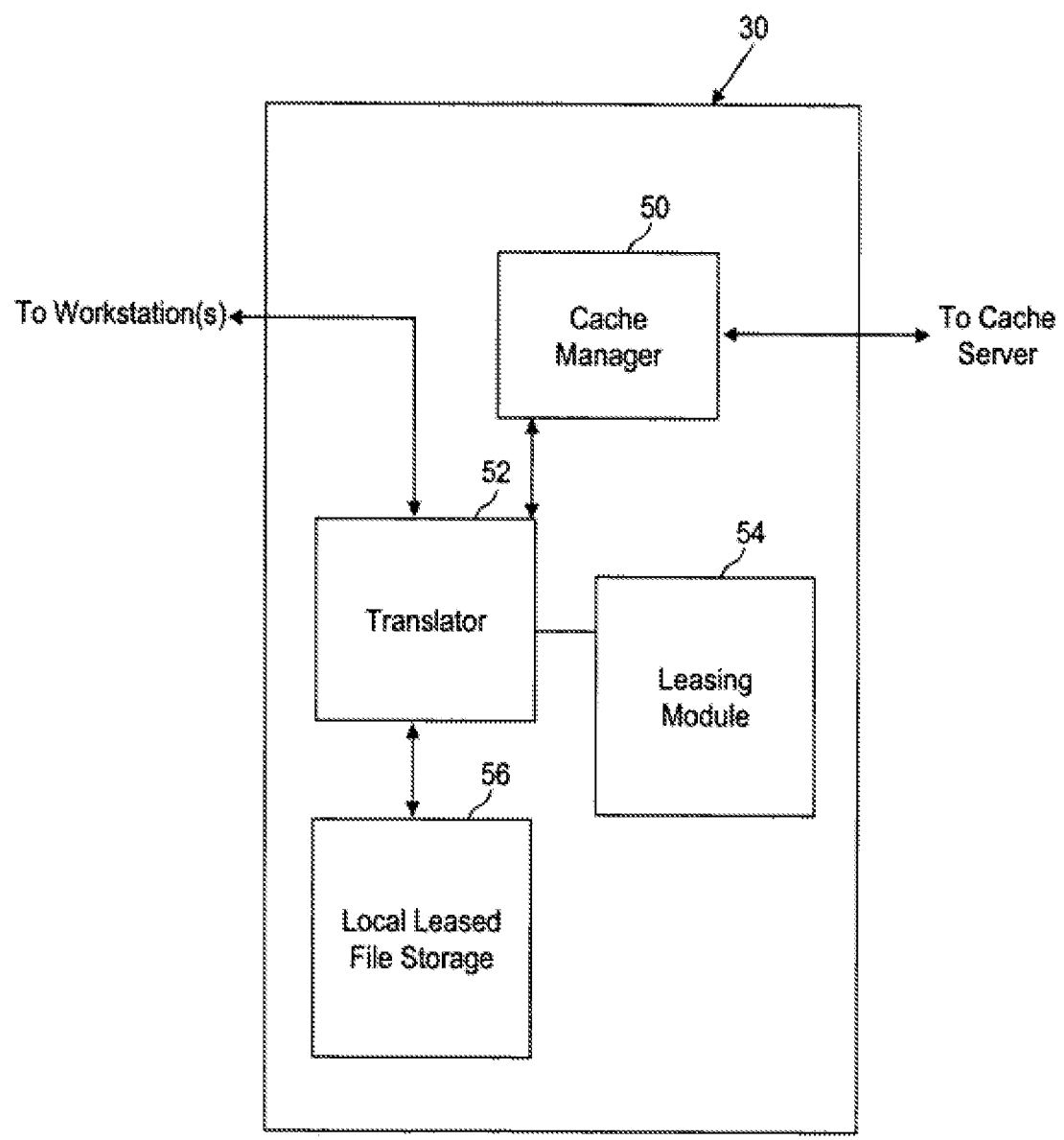
FIG. 3 is a block diagram illustrating the functional components of an EFG appliance (or server), which might be used in some embodiments of the present invention.

FIG. 3 is a block diagram of a storage cache (or EFG appliance), in accordance with the present invention. Referring to FIG. 3, the storage cache 30 includes the modules of a cache manager 50, a translator 52, a leasing module 54, and a local leased file storage 56. The cache manager 50 is coupled to the translator 52 and is coupled to a cache server, such as the cache server 36 as shown in FIG. 2, via gateways and a communications network. The translator 52 is coupled to the leasing module 54 and the local storage 56, and is coupled to workstations of an associated system via an Ethernet connection.

The cache manager 50 controls routing of data files, file update data, and data file leasing information to and from the cache server 36. The translator 52 stores copies of accessed data files at the storage 56 as a cached data file, makes the cached data file available for reading or writing purposes to an associated workstation that requested access to a data file corresponding to the cached data file, and updates the cached data file based on data file modifications entered by the workstation or update data supplied from the cache server. In addition, the translator 52 can generate a checksum representative of a first data file and determine the difference between another data file and the first data file based on the checksum using techniques that are well known. The leasing module 54, through interactions with the cache server 36, determines whether to grant a request for access to a data file from an associated workstation, where the access request requires that the cached data file is made available to the associated workstation either for read or write purposes. Typically, a storage cache is associated with every remote computer system that can access a data file stored at a file server of a data center system over the network 28.

Figure 4:
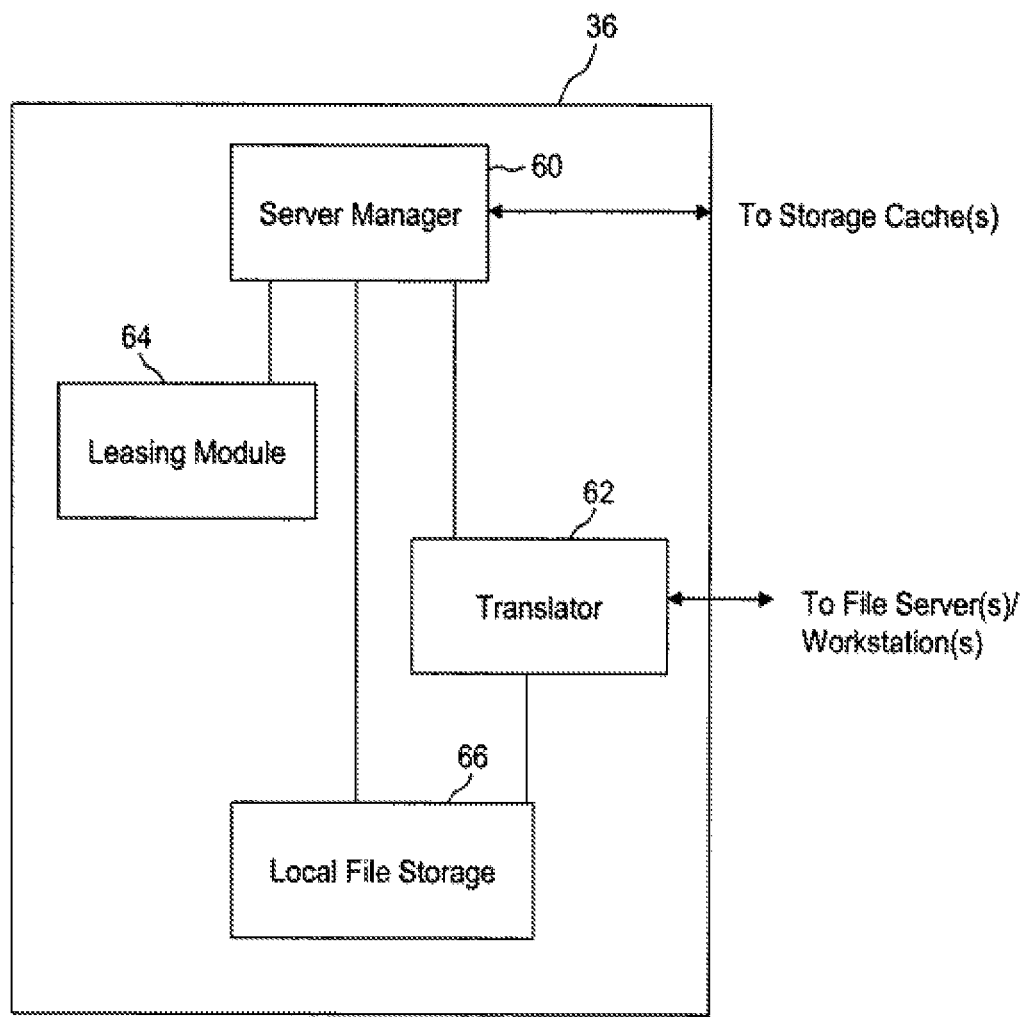
FIG. 4 is a block diagram illustrating the functional components of a CS appliance (or server)

FIG. 4 is a block diagram of the cache server (or CS appliance). The cache server manages shared access to data files stored in the file server by multiple storage caches, such as the caches 30A and 30B, and also by workstations, such as the workstations 22E and 22F of the data center 20, which are not associated with a storage cache. In some implementations, the cache server might be a thin appliance having an architecture that makes it compatible and easily integrated with a distributed file system, such as NAS and SAN (Storage Area Network), implemented at a computer system and a data center computer system.

Referring to FIG. 4, the cache server 36 includes the modules of a server manager 60, a translator 62, a leasing module 64, and a local file storage 66. The server manager 60 is coupled to the translator 62, the leasing module 64 and the storage 66 and also is coupled to storage caches, such as the storage caches 30A and 30B, via the gateway 26C and the network 28. The translator 62 is coupled to the storage 66 and is coupled to a file server of an associated data center computer system via an Ethernet connection. The translator 62 temporarily stores, at the storage 66, copies of data files stored at and obtained from the file server 38, and performs processing using the stored data files and update data received from a storage cache to generate a replacement, updated data file. The translator 62 also replaces a data file stored in the file server 38 with the replacement data file. In addition, the translator 62 can supply to a workstation associated with the central system, such as the workstations 22D and 22E, a copy of a data file stored at the file server 38 only for viewing purposes in accordance with the leasing protocol.

The translator 62, like the translator 52, can generate a checksum representative of a first data file and determine the difference between another data file and the first data file using the checksum. In addition, the leasing module 64, through interactions with the storage caches included in the system 12, determines whether a request for access to a data file from a workstation associated with a specific storage cache should be granted or denied.

It is to be understood that each of the modules of each of the storage caches 30 and the cache server 36, which perform data processing operations, constitutes a software module or, alternatively, a hardware module or a combined hardware/software module. In addition, each of the modules suitably contains a memory storage area, such as RAM, for storage of data and instructions for performing processing operations in accordance with the present invention. Alternatively, instructions for performing processing operations can be stored in hardware in one or more of the modules. Further, it is to be understood that, in some embodiments, the modules within each of the cache server 36 and the storage caches 30 can be combined, as suitable, into composite modules, and that the cache server and storage caches can be combined into a single appliance which can provide both caching for a workstation and real time updating of the data files stored at a file server of a central data center computer system.

The storage caches and the cache server, of the storage caching system 12 provide that a data file stored in a file server of a data center, and available for distribution to authorized workstations via a distributed file system, can be accessed for read or write purposes by the workstations, that the workstations experience reduced latency when accessing the file, and that the cached data file supplied to a workstation in response to an access request corresponds to a real time version of the data file. A storage cache of the system 12 stores in the storage 56 only a current version of the cached data file corresponding to the data file that was the subject of an access request, where the single cached data file incorporates all of the data file modifications entered by a workstation associated with the storage cache while the file was accessed by the workstation.

In a connected mode, file update data associated with the cached data file is automatically, and preferably at predetermined intervals, generated and then transmitted (flushed) to the cache server. Most preferably, the file update data is flushed with sufficient frequency to provide that a real time, updated version of the data file is stored at the file server and can be used by the cache server to respond to an access request from another storage cache or a workstation not associated with a storage cache. In some implementations, the local storage 56 of the storage cache includes only cached data files corresponding to recently accessed data files.

B. System Architecture for EFG Appliance (or Server) and CS (Remote) Appliance (or Server)

Figure 5:
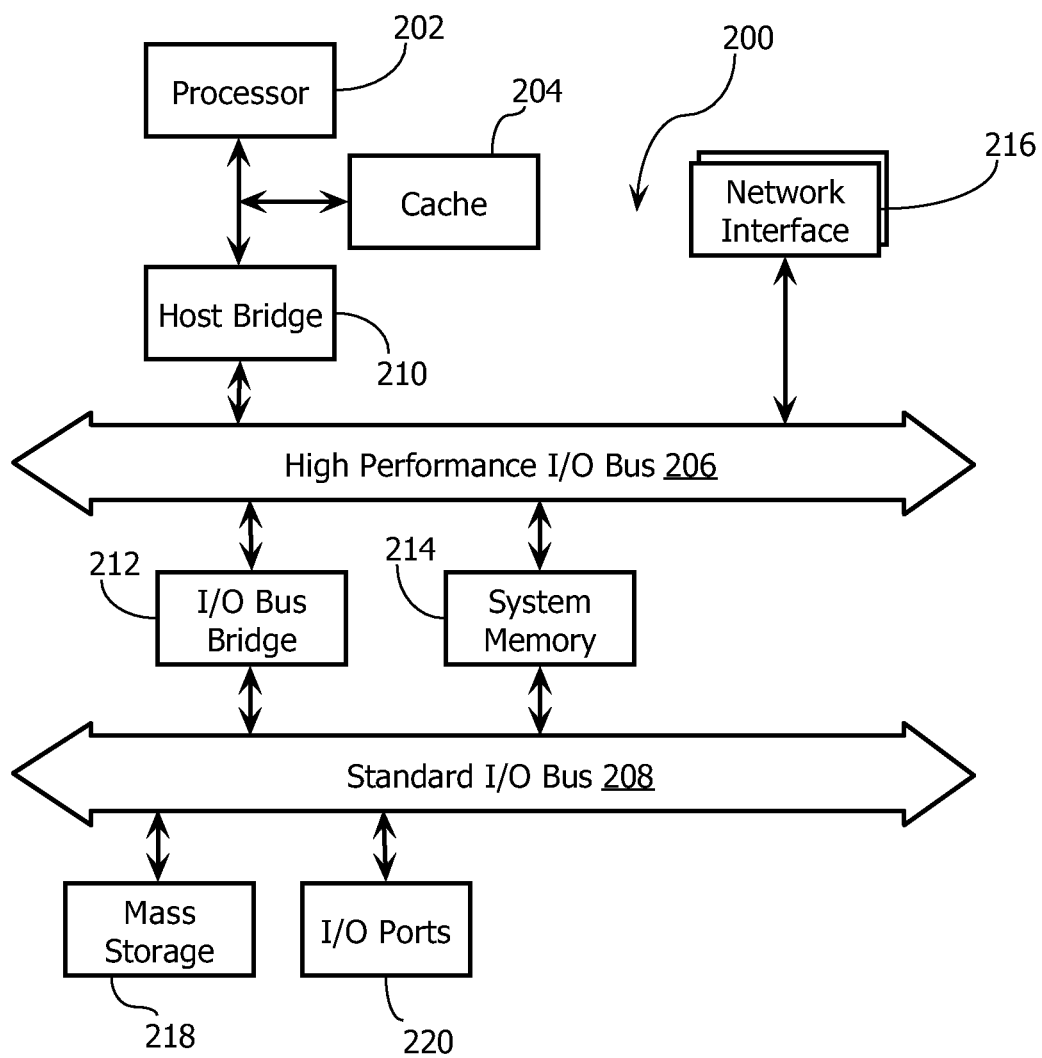
FIG. 5 is a diagram showing a high-level example system architecture that may be used to implement an EFG appliance (or server) or a CS appliance (or server)

FIG. 5 illustrates, for didactic purposes, a hardware system 200, which might be a part of an EFG appliance (or storage cache) or a remote file server appliance (or cache server), in particular embodiments. Typically, an appliance includes an off-the-shelf computer and operating system, but the appliance vendor has designed the computer's box and user interface so that the user cannot access anything on the computer, except for an application interface. Since the underlying computing architecture is locked down and essentially invisible, it becomes difficult to discern that the device really functions on top of general purpose hardware and operating system software. Linux is commonly used as the operating system for such appliances, though other operating systems, such as Windows-based operating systems, are also used. Alternatively, as suggested elsewhere, some embodiments employ an EFG server rather than an EFG appliance and in those embodiments the underlying computer architecture is not locked down. The same is also true of embodiments that employ a CS server, rather than a CS appliance.

In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and one or more network/communication interfaces 216 couple to bus 206. Hardware system 200 may further include video memory (not shown) and a display device coupled to the video memory. Mass storage 218 and I/O ports 220 couple to bus 208. In some, but not all, embodiments, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist with the components of hardware system 200 being coupled to the single bus. Furthermore, hardware system 200 may include additional components, such as additional processors, storage devices, or memories.

In particular embodiments, the processes described herein may be implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® Server 2003 (or other variant) operating system available from Microsoft Corporation of Redmond, Wash. However, the present invention may be used with other suitable operating systems, such as the Windows® 95/98/NT/XP/Vista operating system, available from Microsoft Corporation of Redmond, Wash., the Linux operating system, the Apple Macintosh Operating System, available from Apple Computer Inc. of Cupertino, Calif., UNIX operating systems, and the like.

C. Enhanced Write Command Processing

Typically, when a work station 22A, hosting an application, accesses a file stored on file server 38, an open command identifying the file (e.g., path and file name) is transmitted. Responsive to the open command, the EFG storage cache 26A fetches a current copy of the file from the remote file server 38. In a particular implementation, the EFG storage cache 26A receives the open command (802), as FIG. 8 illustrates, and accesses its cache to determine whether it currently has a copy of the identified file (804). If so, the EFG storage cache 26A opens the cached version of the file, and computes checksums for one or more blocks in the file (805). Specifically, the EFG storage cache 26A divides the file at fixed-size intervals (e.g., 4 Kbytes), and computes a checksum for each resulting block. The EFG storage cache 26A then transmits a fetch command identifying the file to the remote cache server 36 (806). The fetch command, or subsequent packets associated with the fetch command, may include the computed checksums for the blocks, and possibly other file information, such as file size of cached version, last access time, etc.

The remote cache server 36, responsive to the fetch command, retrieves a copy of the identified file from file server 38. As described above, leases for the file may also be obtained. If the fetch command includes checksums, the cache server 36 computes checksums for the retrieved file at block boundaries and compares its computed checksums to the checksums received from the EFG storage cache 26A. Based on these comparisons, the cache server 36 generates a set of commands that the EFG storage cache 26A can use to construct a current version of the file. The set of commands can generated by the cache server 36 can include commands that instruct the EFG storage cache 26A to copy an identified block (if the checksums computed by both ends match), as well as data and commands instructing that the data be inserted at identified offsets in the constructed file. In a particular implementation, the set of commands are generated (or at least processed by the EFG storage cache 26A) in a sequential or streaming manner in that the current cached copy of a file is constructed starting at the beginning of the file and proceeding to the end. In a particular implementation, the cache server 36 transmits the set of commands in one or more command packets, where the commands are sequentially ordered based on file offsets. As discussed below, during a fetch process, the EFG storage cache 26A sequentially reconstructs the file as the command packets are received.

Of course, while the fetch and reconstruction process is being executed relative to a file, an application that initially opened the file may transmit one or more commands, such as read commands and write commands. As to read commands, the EFG storage cache 26A may satisfy the command with a cached version of the file, if the fetch process has reached the data segment identified in the read command, or pass the read command on to the file server 38. Both read and write commands identify an offset (a byte location in a file) and a length. Write commands also include the data to be written starting at the offset.

Figure 6:
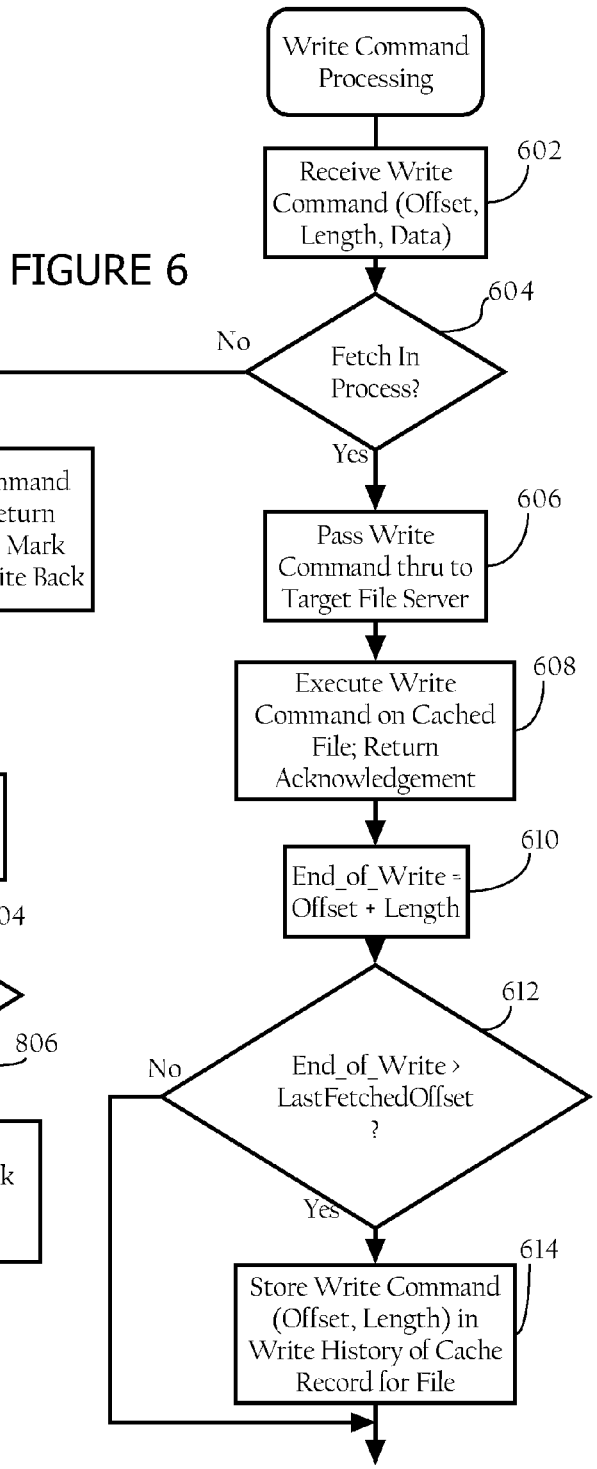
FIG. 6 is a flow chart illustrating a method for processing write commands according to one possible implementation of the invention.

FIG. 6 illustrates a method of processing write commands, according to one implementation of the invention, which may be used at an EFG storage cache 26A to process write commands. When EFG storage cache 26A receives a write command from a given application (602), it determines whether a fetch process for the file is concurrently in process (604). If the fetch process is completed, a current version of the file is stored at EFG storage cache 26A. Accordingly, the EFG storage cache 26A executes the write command on the cached version of the file, and returns an acknowledgement to the requesting application. In a particular implementation, the EFG storage cache 26A marks the file as "dirty," which causes the updated segments of the file to be transmitted to the cache server 36 and ultimately the file server 38 when the requesting application closes the file.

Otherwise, if a fetch of the file is currently in process (604), the EFG storage cache 26A, rather than holding the write command until the fetch completes, passes the write command thru to the cache server 36, which passes the command thru to the target file server 38 for execution (606). In addition, the EFG storage cache 26A executes the write command on the cached version of the file, and returns an acknowledgement to the requesting application (608). Notably, the cached version of the file is not marked as dirty since the write command is passed thru to the target file server 38. In this manner, an acknowledgement can be transmitted to the requesting application with lower latency (e.g., without having to wait for an acknowledgement from the target file server 38 or the fetch process to complete), thereby improving performance and reducing the possibility of time outs or other errors.

The EFG storage cache 26A also selectively stores the write command information in a write history associated with the cached version of the file depending on the progress of the fetch process. In a particular implementation, the EFG storage cache 26A computes the ending location (End_of_Write) in the file associated with the write command by adding the length to the offset identified in the write command (610). As discussed above, as the fetch process executes for the file, the file is sequentially reconstructed. A LastFetchedOffset variable is incremented as the file re-construction commands generated by the server cache 36 are processed by the EFG storage cache 26A to indicate the progress of the fetch command. The EFG storage cache 26A compares the ending location of the write command to the offset in the file to where the fetch process has reached (LastFetchedOffset) (612). If the fetch process has not reached the ending location (End_of_Write) of the write command, the EFG storage cache 26A stores the offset and length of the write command in a write history associated with a cache record for the file (614). This stored write command information is used when command packets including file construction commands are received at the EFG storage cache 26A, as described below. In one implementation, write commands stored in the write history that correspond to overlapping or directly adjacent data segments can be collapsed into one write command entry. For example, a first write command (offset=8192 byte, length=100 bytes) and a second write command (offset=8292, length=500 bytes) can be collapsed into a single entry (offset=8192, length=600 bytes). In addition, the write commands may also be stored in order of increasing offset values, which facilitates fetch processing and determining overlaps between reconstruction commands and stored write commands (see below).

Figure 7:
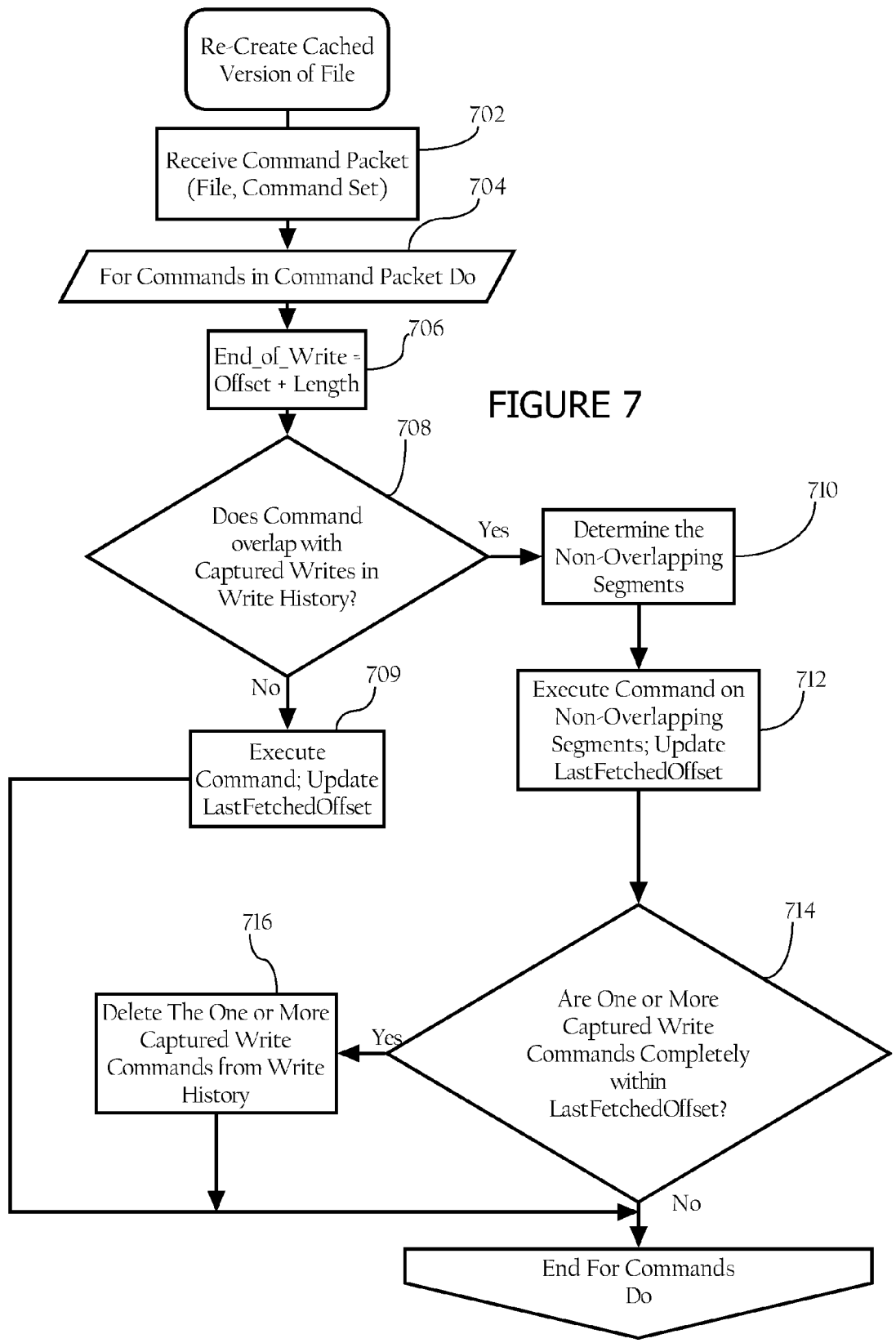
FIG. 7 is a flow chart providing a method for re-creating a cached version of a file from command packets received from a remote server cache.

FIG. 7 illustrates a process, according to one possible implementation of the invention, for processing file re-construction commands received at the EFG storage cache 26A. As discussed above, a server cache 36 can send file re-construction commands in a sequential manner (relative to offsets) in one or more command packets including commands and literal data. In one implementation, the EFG storage cache 26A processes the command packets as they are received, assuming that they are received in a sequential manner. Otherwise, the EFG storage cache 26A may store the command packets in a re-ordering buffer and process them when sequential processing is possible.

As FIG. 7 illustrates, a command packet identifies a file and includes a command set including one or more re-construction commands and possibly literal data. When the EFG storage cache 26A receives a command packet (702), the EFG storage cache 26A iteratively processes the commands in the command packet (704). As to each command, the EFG storage cache 26A computes an ending location (End_of_Write) for the reconstruction command (706), and determines whether the data segment associated with the reconstruction command overlaps with the data segment information associated with the stored write command information in the write history of the cached file (708). If there is no overlap, the EFG storage cache 26A executes the reconstruction command on the cached file (709), such as copying a cached version of a block, or inserting new data at a given offset in the cached version of the file, and updates the LastFetchedOffset value for the file. If there is an overlap, the EFG storage cache 26A identifies the non-overlapping segments of the reconstruction command (710) and executes the reconstruction command only as to the non-overlapping segments of the re-construction command and updates the LastFetchedOffset value for the file (712). For example, if the write history for the cached version of the file includes an entry (offset=8192, length=600 bytes) and a reconstruction command instructs insertion of data beginning at offset 8050 and a length of 300 bytes, the EFG storage cache 26A will execute the reconstruction command up to offset location 8192. In this manner, the write commands executed by the EFG storage cache 26A on the cached version of the file during the fetch process are not over-written when the reconstruction commands are received.

Still further, in a particular implementation, the EFG storage cache 26A may also selectively delete one or more entries in the write history associated with the cached version of the file. In a particular implementation, if one or more captured write commands in the write history (relative to segment location—offset and length) are completely within LastFetchedOffset value (714), the EFG storage cache 26A deletes the one or more identified entries from the write history (716). The remaining write command entries, if any, can be flushed when the fetch process is completed. As one will appreciate, the foregoing allows write commands issued by requesting applications to be processed and acknowledged to improve performance, while also maintaining file consistency between the cached copy of the file and the master copy on the data center file server.

Particular embodiments of the above-described process might be comprised of instructions that are stored on storage media. The instructions might be retrieved and executed by a processing system. The instructions are operational when executed by the processing system to direct the processing system to operate in accord with the present invention. Some examples of instructions are software, program code, firmware, and microcode. Some examples of storage media are memory devices, tape, disks, integrated circuits, and servers. The term "processing system" refers to a single processing device or a group of inter-operational processing devices. Some examples of processing devices are integrated circuits and logic circuitry. Those skilled in the art are familiar with instructions, storage media, and processing systems.

Those skilled in the art will appreciate variations of the above-described embodiments that fall within the scope of the invention. In this regard, it will be appreciated that there are many possible orderings of the steps in the process described above and many possible modularizations of those orderings. Further, in embodiments where processing speed is not determinative, the process might run in the control plane rather than the data plane. As a result, the invention is not limited to the specific examples and illustrations discussed above, but only by the following claims and their equivalents.

What is claimed is:

1. An apparatus comprising
one or more network interfaces;
a memory;
one or more processors;
computer-readable instructions stored in the memory operable to cause the one or more processors to
initiate, responsive to a file open command received from a requesting application, a fetch of a file identified in the file open command from a remote host, the file located remotely from the one or more processors;
forward, while the fetch is in process, write commands identifying the file to the remote host for remote execution of the write commands;
locally execute the write commands on a cached version of the file, wherein the cached version of the file is local to the one or more processors;
construct the cached version of the file as file construction commands are received from the remote host, wherein the file construction commands are selectively processed to avoid overwriting data of the cached version of the file corresponding to the locally executed write commands.

2. The apparatus of claim 1 wherein the computer readable instructions are further operable to cause the one or more processors to
access, responsive to the file open command, a local cache to identify if a cached version of the identified file is stored in the local cache;
compute, if a cached version of the identified file exists in the local cache, one or more data signatures for one or more blocks of the cached version of the data file; and
transmit the one or more data signatures to the remote host.

3. The apparatus of claim 1 wherein the computer readable instructions are further operable to cause the one or more processors to
maintain a write history for the cached version of the file;
conditionally add offset and length data associated with the received write commands to the write history based on progress of the file fetch.

4. The apparatus of claim 3 wherein the computer readable instructions are further operable to cause the one or more processors to
access the write history of the file to conditionally execute the file construction commands on portions of the cached version of the file outside of data segments identified in the write history.

5. The apparatus of claim 3 wherein the write history is maintained as an ordered set of write commands sorted by offset value.

6. The apparatus of claim 3 wherein the computer readable instructions are further operable to cause the one or more processors to
collapse contiguous or overlapping write commands in the write history into one write command entry.

7. A method comprising
initiating, responsive to a file open command received from a requesting application, a fetch of a file identified in the file open command from a remote host, the file located remotely;
forwarding, while the fetch is in process, write commands identifying the file to the remote host for remote execution of the write commands;
locally executing the write commands on a cached version of the file, wherein the cached version of the file is local;
constructing the cached version of the file as file construction commands are received from the remote host, wherein the file construction commands are selectively processed to avoid overwriting data of the cached version of the file corresponding to the locally executed write commands.

8. The method of claim 7 further comprising
accessing, responsive to the file open command, a local cache to identify if a cached version of the identified file is stored in the local cache;
computing, if a cached version of the identified file exists in the local cache, one or more data signatures for one or more blocks of the cached version of the data file; and
transmitting the one or more data signatures to the remote host.

9. The method of claim 7 further comprising
maintaining a write history for the cached version of the file; and
conditionally adding offset and length data associated with the received write commands to the write history based on progress of the file fetch.

10. The method of claim 9 further comprising
accessing the write history of the file to conditionally execute the file construction commands on portions of the cached version of the file outside of data segments identified in the write history.

11. The method of claim 9 wherein the write history is maintained as an ordered set of write commands sorted by offset value.

12. The method of claim 9 further comprising
collapsing contiguous or overlapping write commands in the write history into one write command entry.

13. A system comprising
an edge file cache node and a server cache node;
wherein the edge file cache node comprises
one or more network interfaces;
a memory;
one or more processors; and
computer-readable instructions stored in the memory operable to cause the one or more processors to: initiate, responsive to a file open command received from a requesting application, a fetch of a file identified in the file open command from the server cache node; forward, while the fetch is in process, write commands identifying the file to the server cache node for remote execution; locally execute the write commands on a cached version of the file, the cached version of the file stored in the memory; and construct the cached version of the file as file construction commands are received from the server cache node, wherein the file construction commands are selectively processed to avoid overwriting data of the cached version of the file corresponding to the locally executed write commands;
wherein the server cache node comprises
a server cache node
one or more network interfaces;
a memory;
one or more processors; and
computer-readable instructions stored in the memory operable to cause the one or more processors to: retrieve the file from a remote host, responsive to the fetch initiated by the edge file cache node; forward write commands to the file from the edge file cache node to the remote host; and generate and transmit to the edge file cache node file construction commands for the file.

14. The system of claim 13 wherein the computer readable instructions are further operable to cause the one or more processors to access, responsive to the file open command, a local cache to identify if a cached version of the identified file is stored in the local cache;

compute, if a cached version of the identified file exists in the local cache, one or more data signatures for one or more blocks of the cached version of the data file; and transmit the one or more data signatures to the remote host.

15. The system of claim 13 wherein the computer readable instructions are further operable to cause the one or more processors to maintain a write history for the cached version of the file;

conditionally add offset and length data associated with the received write commands to the write history based on progress of the file fetch.

16. The system of claim 15 wherein the computer readable instructions are further operable to cause the one or more processors to access the write history of the file to conditionally execute the file construction commands on portions of the cached version of the file outside of data segments identified in the write history.

17. The system of claim 15 wherein the write history is maintained as an ordered set of write commands sorted by offset value.

18. The system of claim 15 wherein the computer readable instructions are further operable to cause the one or more processors to collapse contiguous or overlapping write commands in the write history into one write command entry.

* * * * *